(12) United States Patent
Iwamura

(10) Patent No.: US 7,689,825 B2
(45) Date of Patent: Mar. 30, 2010

(54) SYSTEMS AND METHODS FOR DEVICE REGISTRATION USING OPTICAL TRANSMISSION

(75) Inventor: Ryuichi Iwamura, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1042 days.

(21) Appl. No.: 11/388,813

(22) Filed: Mar. 23, 2006

(65) Prior Publication Data

US 2006/0190731 A1    Aug. 24, 2006

Related U.S. Application Data

(63) Continuation-in-part of application No. 11/332,899, filed on Jan. 17, 2006.

(60) Provisional application No. 60/655,225, filed on Feb. 22, 2005.

(51) Int. Cl.
*H04L 9/32* (2006.01)
*H04K 1/00* (2006.01)

(52) U.S. Cl. .................. 713/171; 380/273; 380/278

(58) Field of Classification Search ............... 713/171; 380/273, 278
See application file for complete search history.

(56) References Cited

U.S. PATENT DOCUMENTS

| | | | |
|---|---|---|---|
| 6,748,083 B2 * | 6/2004 | Hughes et al. | 380/278 |
| 7,457,413 B2 * | 11/2008 | Thuvesholmen et al. | 380/46 |
| 2002/0153998 A1 | 10/2002 | Litwin, Jr. et al. | |
| 2003/0028770 A1 | 2/2003 | Litwin, Jr. et al. | |
| 2004/0243496 A1 * | 12/2004 | Kim et al. | 705/35 |
| 2005/0005150 A1 | 1/2005 | Ballard | |
| 2005/0169056 A1 | 8/2005 | Berkman et al. | |
| 2005/0177624 A1 | 8/2005 | Oswald et al. | |

* cited by examiner

*Primary Examiner*—Nasser G Moazzami
*Assistant Examiner*—Mohammad W Reza
(74) *Attorney, Agent, or Firm*—Cowell & Moring LLP

(57) ABSTRACT

A client device is registered with a network server by having the network server generate a key number and emit an optical representation of the key number for optical reception by the client device. The client device determines the key number from the received optical representation, and encrypts or decrypts a communication using the key number, or a value based on the key number. In one embodiment, the optical representation may be either an infrared signal or visible light signal.

13 Claims, 4 Drawing Sheets

SYSTEMS AND METHODS FOR DEVICE REGISTRATION USING OPTICAL TRANSMISSION

CROSS-REFERENCE TO RELATED APPLICATION

This application is a continuation-in-part of U.S. patent application Ser. No. 11/332,899 filed on Jan. 17, 2006, which claims the benefit of U.S. Provisional Application No. 60/655,225, filed Feb. 22, 2005.

FIELD OF THE INVENTION

The invention relates in general to networks, and in particular to securing network communications by registering devices using optical transmissions.

BACKGROUND

Home networking is a rapidly growing area. Types of popular home networks include wireless IEEE 802.11 networks, HomePlug®1.0 PLC and IEEE 802.3 Ethernet networks. One constant concern with such networks is security. For example, in the case of a powerline communication network, neighbors share a common network infrastructure. Without properly encrypting communications, the security of one's data may be compromised.

The most common approach to maintaining network security has been through the use of encryption. Many systems rely on a private key encryption scheme in which a new client device registers with the server using a unique ID. The server is programmed with the client's ID or key, which may be used by both the server and the client to communicate with each other. One problem with the aforementioned approach is the laborious process of having to program the server with each client's key. This problem is compounded by the fact that servers are often located in difficult-to-access areas of the home. Another problem with this approach is that the client IDs are susceptible to interception during the initial registration process using, for example, what is known as a man-in-the-middle (MITM) attack.

As described in the parent application, another approach is to have the user manually enter a "secret number" displayed by a server. The secret number is first displayed on a display screen of the server. After reading the server display, the user manually depresses one or more keys on an infrared (IR) remote control which, in turn, transmits the secret code in an IR signal to the client to be registered on the network, as well as to the server. While this may overcome the MITM attack problem mentioned above, the problem with this approach is that the server is often located in a difficult-to-access location and cannot be readily seen, which means the generated secret code may not be visible to the user. Moreover, the user is still required to manually enter the server-generated code into each client device. Thus, what is needed is a system and method for device registration using optical transmissions.

BRIEF SUMMARY OF THE INVENTION

Disclosed and claimed herein are systems and methods for device registration using optical transmissions. In one embodiment, a method includes generating a key number by a network server, emitting an optical representation of the key number, and receiving the optical representation by the client device. The client device may then determine the key number from the optical representation, and encrypt a communication using a value based on the key number.

Other aspects, features, and techniques of the invention will be apparent to one skilled in the relevant art in view of the following detailed description of the invention.

DETAILED DESCRIPTION OF THE PREFERRED EMBODIMENT

Figure 1:
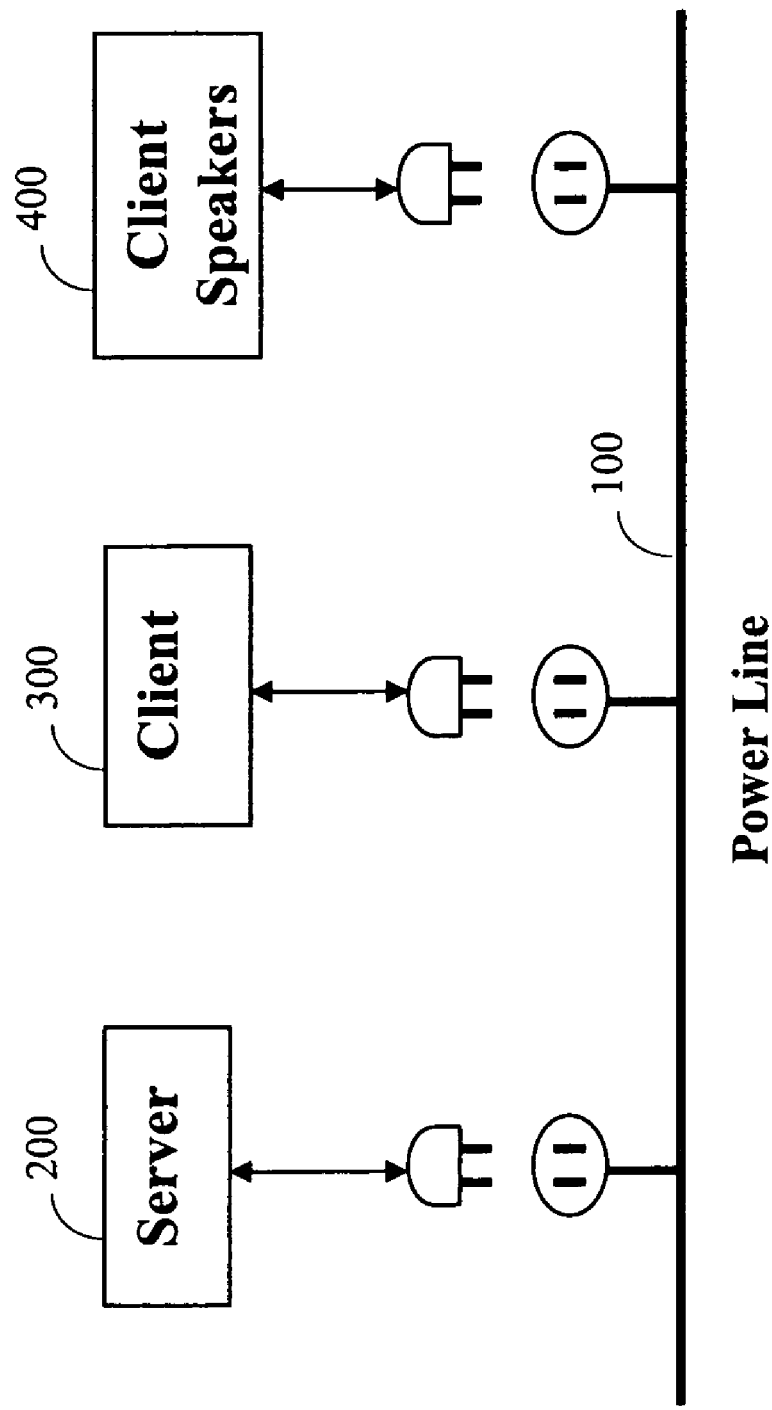
FIG. 1 is a system-level diagram showing the network connectivity of one or more components of one embodiment of the invention.

One aspect of the invention is to register a client device with a network server by having the network server generate a key number and emit an optical representation of the key number for optical reception by the client device. The client device may then determine the key number from the received optical representation, and encrypt or decrypt a communication using the key number, or a value based on the key number. In one embodiment, the network is an IEEE 802.11 network, a powerline communication network (e.g., HomePlug®01.0 PLC) or an IEEE 802.3 Ethernet network. In addition, the optical representation may be either an infrared signal or an LED signal.

The key number may then be used to encrypt an encryption key, such as by using a hashing algorithm as described in the parent application. The encrypted encryption key may then be transmitted securely over the network with no unencrypted data ever being sent. Once the encrypted encryption key is received by a client device, it may be decrypted using the same hashing of the key number that was used to encrypt such a key. After the encryption key has been distributed to one or more clients in this fashion, subsequent network communications may be encrypted/decrypted using the encryption key. It should be appreciated that other variations of this communication exchange are also consistent with the invention, including those other embodiments disclosed in the parent application.

In short, device registration on a network may be carried out using optical transmissions to exchange a secret key number between at least a server and a client. The key number is not sent over the network in an unencrypted form, but is used to complete an authentication and encryption key exchange process carried out between at least the server and the client. In this fashion, no unencrypted information is sent over the network and, as such, network communications are not susceptible to MITM attacks. Moreover, the server need not be readily accessible in order to register a new client on the network.

As used herein, the terms "a" or "an" shall mean one or more than one. The term "plurality" shall mean two or more than two. The term "another" is defined as a second or more. The terms "including" and/or "having" are open ended (e.g., comprising). The term "coupled" means connected to, although not necessarily directly, and not necessarily mechanically. The term "program," "computer program," and similar terms means a sequence of instructions designed for execution on a computer system. This may include subroutines, functions, procedures, object methods, object implementations, an executable application, applets, servlets, source code, object code, shared library/dynamic load library and/or other sequence of instructions designed for execution on a computer system.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the figures, FIG. 1 depicts a simplified diagram of the interconnectivity between a server 200, a client 300 and client speaker 400, all in communication with each other over a powerline communication (PLC) network 100. It should of course be appreciated that there may be multiple clients and/or client speakers coupled to the network 100. It should further be appreciated that while the following description may be in terms of a PLC network, other types of networks, such as wireless radio frequency networks, would similarly benefit from the invention.

Figure 2:
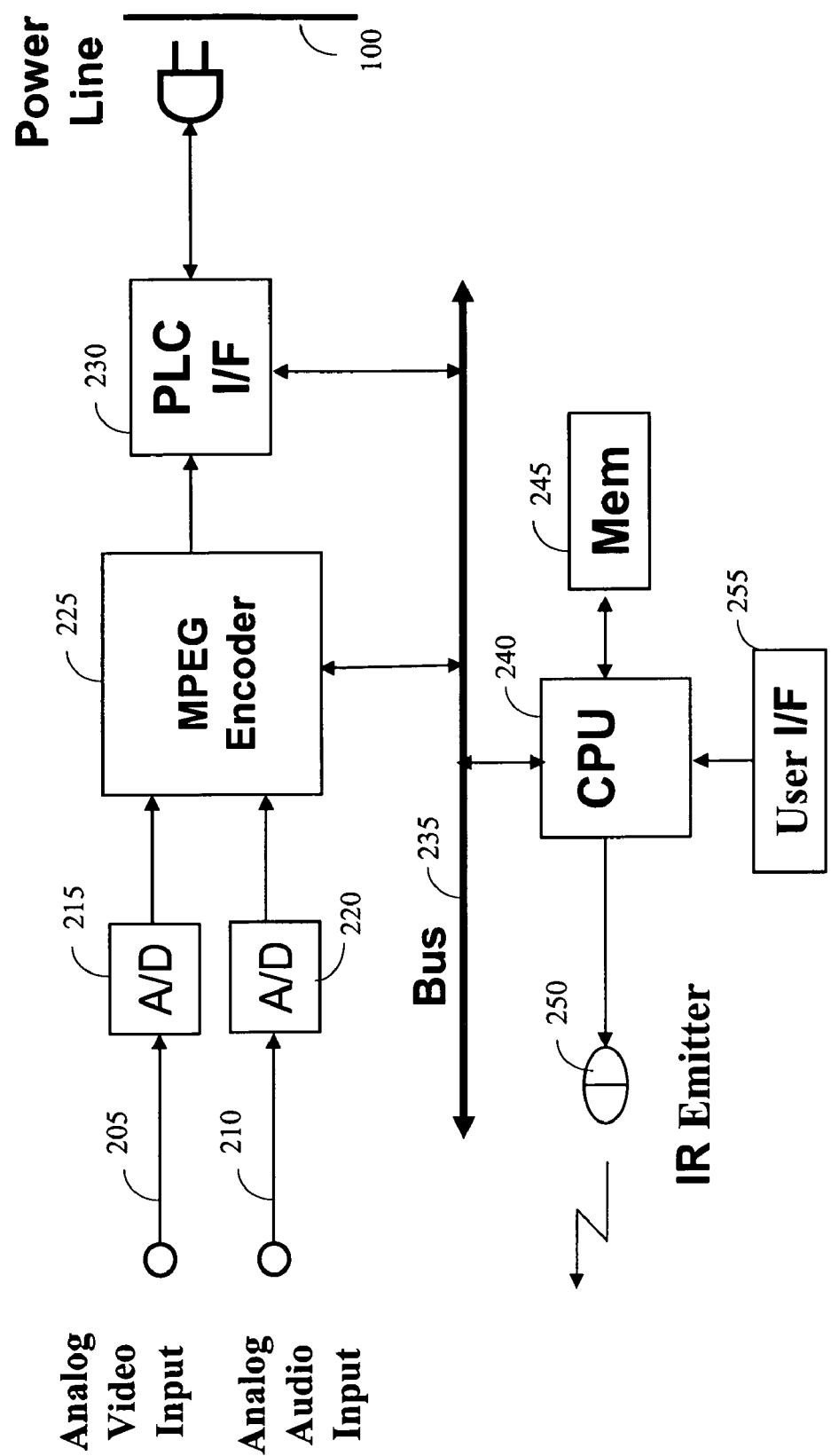
FIG. 2 is a block diagram of a server consistent with the principles of one embodiment of the invention.

FIG. 2 is one embodiment of a block diagram for server 200 of FIG. 1. In particular, the server 200 includes an analog video input 205 and a corresponding analog audio input 210. These inputs may be connected to any data source device (not shown), such as a DVD player, a VCR, a gaming console, a personal computer, etc. The incoming video signal may then be converted from analog to digital at the A/D converter 215. Similarly, the incoming audio signal may be converted at A/D converter 220. In each case, the resulting digital data stream may be sent to the MPEG encoder 225. In one embodiment, the MPEG encoder 225 is used to encode the incoming signals and generate a MPEG stream. This MPEG stream may then be sent on to the powerline network (PLC) interface 230, as shown in FIG. 2. As will be described in more detail below, the PLC interface 230 may provides the data stream to the network 100 for transmission to the client 300 and/or the client speakers 400.

Continuing to refer to FIG. 2, the server 200 further includes a CPU 240 that is coupled to the MPEG encoder 225 and the PLC interface 230 via internal bus 235. In one embodiment, the CPU 240 may be used to control the various components in the server 200. The memory 245 stores computer program sequences that will be executed by the CPU 240 to operate the server 200. User interface 255 is any interface (e.g., a group of buttons) capable of enabling a user to provide input signals to server 200. Such input signals are processed by CPU 240.

In one embodiment, the server 200 may receive from the client 300 a control command (ex. start, stop, skip, fast forward, fast rewind, etc.) over the powerline communication 100. The control command would be received by the PLC interface 230 and forwarded to the CPU 240. The CPU 240 may then interpret the command and convert it to an associated infrared (IR) command. This IR command may then be sent to IR emitter 250, from which the command would then be transmitted to the data source device.

Figure 3:
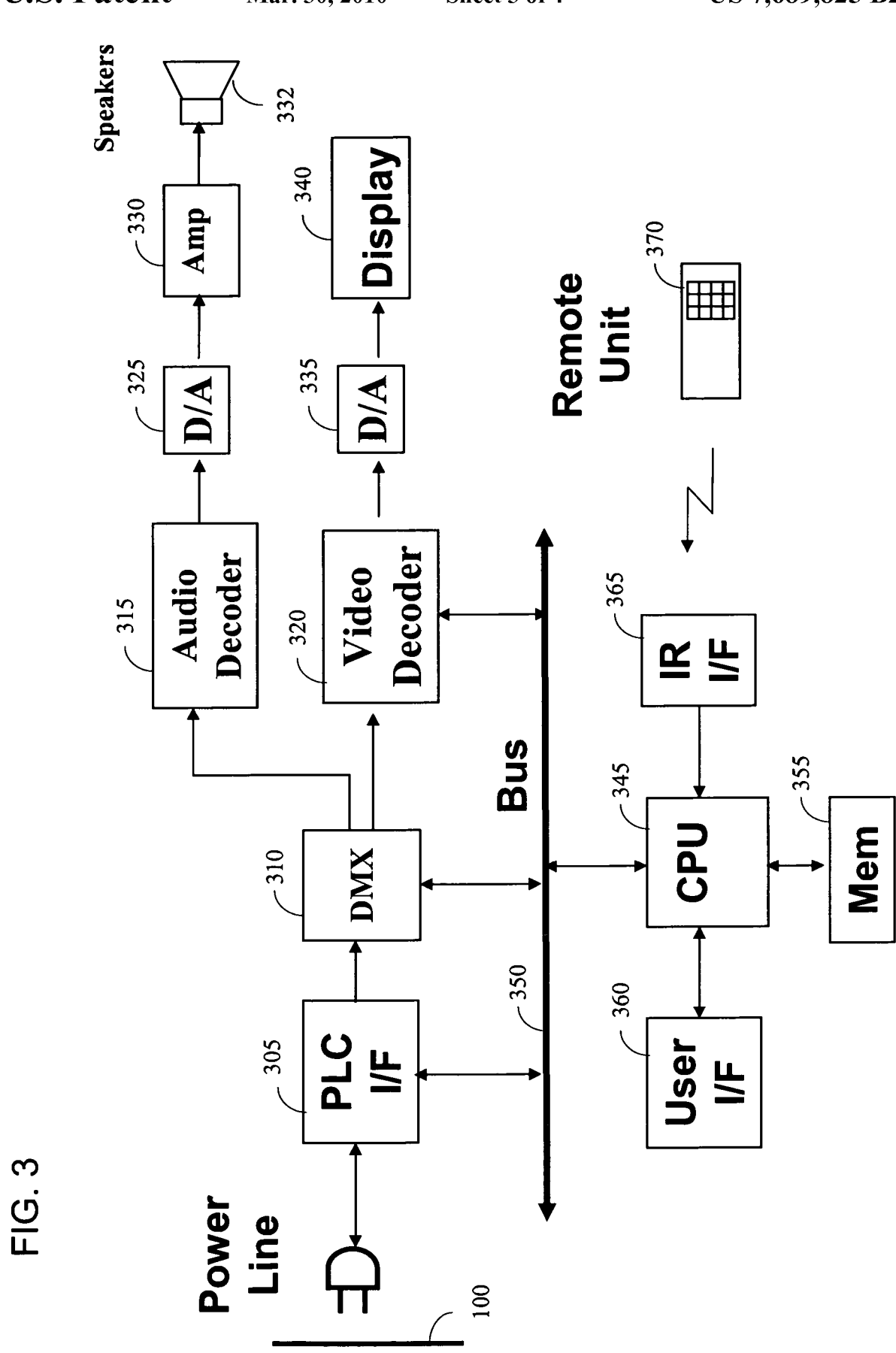
FIG. 3 is a block diagram of a client device consistent with the principles of one embodiment of the invention.

Referring now to FIG. 3, depicted is client 300 in an embodiment of a display device, such as a television. In one embodiment, an audio/video stream sent from a server 200 is received by the PLC interface 305. The steam may then be de-multiplexed by the de-multiplexer 310. The audio data portion of the stream may then be sent to the MPEG audio decoder 315, while the video data portion may be sent to the MPEG video decoder 320. In one embodiment, the decoded audio signal must be digital-to-analog converted by D/A 325 before it is amplified at the amplifier 330 and finally sent to the speakers 332. Similarly, for the video data portion the decoded video signal is digital-to-analog converted at the D/A 335 and sent to the display device 340.

The CPU 345 is coupled to and controls these various components via internal bus 350. Memory 355 may be used to store instruction sequences executable by the CPU 345 for operating the client 300. The user interface 360 may be, for example, a group of buttons and/or light emitting diodes (LEDs). However, in other embodiments the user interface 360 may be comprised of any interface capable of enabling a user to provide input to and receive visual indications from the client device 300. The IR interface 365 is usable to receive IR commands from a remote commander unit 370, as shown in FIG. 3, and in turn provide such commands to the CPU 345 for processing. As mentioned above, the client CPU 345 may then send a corresponding command (e.g., channel up/down) to the server 200 of FIG. 2, as previously discussed, over the powerline network 100 to control the server 200. In this fashion, user commands may be essentially routed through a client device, to the server, and then on to another device, such as the previously-mentioned data source device, for example, a DVD player.

In one embodiment, the client device 300 of FIG. 3 may be a client speaker 400. In one embodiment, the client speaker 400 has only a simple functionality to decode the audio stream sent from the server 200. All interactions may be done from the user interface 360 of the client 300.

Figure 4:
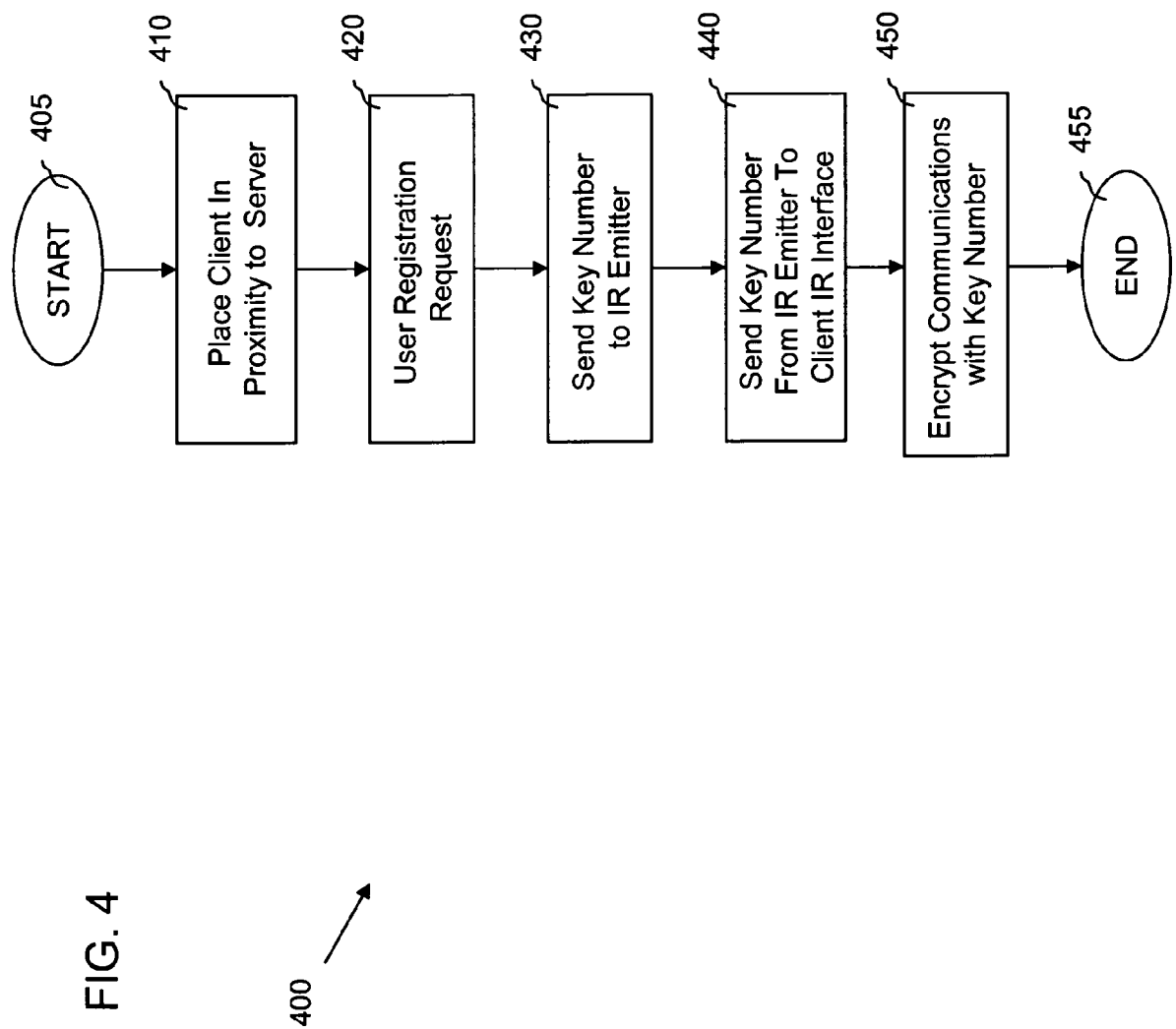
FIG. 4 is one embodiment of a process for carrying out one or more aspects of the invention.

Referring now to FIG. 4, depicted is one embodiment of a process for registering a client device (e.g., client 300) with a server (e.g., server 200) on a powerline communication network (e.g., network 100). The process 400 starts with block 405. At block 410, the user places the client to be registered in proximity to the server. In one embodiment, the client is placed such that the IR signal from the server's IR emitter (e.g., IR emitter 250) reaches an IR interface of the client (e.g., IR Interface 365). Once this is done, the process may continue with the user requesting that the client be registered at block 420. In one embodiment, this request may be submitted via a user interface of the server (e.g., user interface 255). In another embodiment, the server and/or client may be placed in a registration mode during which the server will generate a secret key number, and during which the client will accept the secret key number from the server. In one embodiment, this registration mode is as described in the parent application.

The key generation process may be carried out using a random number generator of the server, as described in the parent application. However, it should equally be appreciated that other encryption key generations processes may be used consistently with the invention. In any case, it should further be appreciated that the server may often change the key number for added security.

Process 400 continues to block 430 where the server-generated key number is sent from the server's CPU and/or internal memory to the server's IR emitter. At block 440, server's IR emitter then sends the key number to the client IR interface, which then stores the key number. Now the server and the client share the same secret key number and can use it to encrypt future communications and/or an encryption key (block 450). The process 400 ends at block 455. In one embodiment, the encryption and authentication process follow one or more of the hashing scheme and authentication processes set forth in the parent application. In this fashion, process 400 enables secure communication over a shared network, such as a PLC network, without ever sending unencrypted data over the network, and without the need for visual access to the network server.

In additional embodiments, a common network key (public encryption key) may be used to encrypt communications with another client device in the same logical network, but without compromising security in a shared physical network architecture, such as a PLC network.

While the preceding disclosure has been in terms of IR, it should be appreciated that other forms of optical transmissions may similarly be employed. For example, visible light (normal LED) may be used. Usually, each device has a power indicator LED, such as described above with reference to FIG. 3 when the IR interface 365 is replaced by an LED. In such an embodiment, the LED blinks to send the key number to the receiver, which may be a client or the server, that is equipped with a light reception interface.

While the present discussion has used the terms "server" and "client" in exemplary embodiments, it should equally be appreciated that a client device can operate in the manner described above as a that of a server, and a server device can operate in the manner described above as a client. Hence, the terms "client" and "server" are not to be construed strictly in connection with limiting the claims. The terms should merely be considered labels for each device in connection with its respective operation.

While certain of the above exemplary embodiments are based upon use of a programmed processor, the invention is not limited to such exemplary embodiments, since other embodiments could be implemented using hardware component equivalents such as special purpose hardware and/or dedicated processors. Similarly, general purpose computers, microprocessor based computers, microcontrollers, optical computers, analog computers, dedicated processors, application specific circuits and/or dedicated hard wired logic may be used to construct alternative equivalent embodiments.

It should further be appreciated that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While the preceding description has been directed to particular embodiments, it is understood that those skilled in the art may conceive modifications and/or variations to the specific embodiments described herein. Any such modifications or variations which fall within the purview of this description are intended to be included herein as well. It is understood that the description herein is intended to be illustrative only and is not intended to limit the scope of the invention.

What is claimed is:

1. A method for registering a client device with a network server for enabling secured communication between the client device and the network server over a network comprising:
   generating a key number by the network server;
   emitting an optical representation of the key number;
   receiving said optical representation of the key number by the client device;
   determining, by the client device, the key number from the optical representation prior to having any communication with the network server over the network;
   encrypting, by the network server, an encryption key using a hashed value of the key number;
   sending the encryption key in an encrypted form over the network from the network server to the client device;
   registering the client device with the network server without having transmitted any unencrypted information over the network; and
   decrypting said encryption key, by the client device, using the hash value of the key number;
   encrypting and decrypting communications between the network server and the client device using the encryption key.

2. The method of claim 1, wherein the network is one of a powerline communication network and a radio frequency network.

3. The method of claim 1, wherein emitting the optical representation comprises emitting an infrared signal generated by the network server.

4. The method of claim 1, wherein emitting the optical representation comprises emitting a light signal generated by the network server.

5. The method of claim 1, wherein receiving comprises receiving said optical representation using an infrared reception interface.

6. The method of claim 1, wherein determining comprises converting the optical representation to the key number.

7. The method of claim 1, wherein further comprising entering a registration mode prior to said generating the key number.

8. A system comprising:
   a network;
   a network server coupled to the network, wherein the network server is to,
      generate a key number,
      emit an optical representation of the key number, and
      encrypt an encryption key using a hashed value of the key number,
      send the encryption key in an encrypted form over the network for use in client device registrations,
      register the client device with the network server without transmitting any unencrypted information over the network; and a client device coupled to the network, wherein the client device is to,
   receive said optical representation of the key number,
   determine the key number from the optical representation prior to having any communication with the network server over the network, and
   decrypt the encryption key using the hashed value of the key number, wherein the encryption key is used to encrypt and decrypt communications between the network server and the client device.

9. The system of claim 8, wherein the network is one of a powerline communication network and a radio frequency network.

10. The system of claim 8, wherein the optical representation is an infrared signal.

11. The system of claim 8, wherein the optical representation is a light signal.

12. The system of claim 8, wherein the client device includes an infrared reception interface to receive said optical representation.

13. The system of claim 8, wherein the network server enters a registration mode prior to generating the key number.

* * * * *